US008014791B2

(12) United States Patent
Guigné et al.

(10) Patent No.: US 8,014,791 B2
(45) Date of Patent: Sep. 6, 2011

(54) METHOD AND SYSTEM FOR DETERMINING POSITION OF A WIRELESS ELECTRONIC DEVICE WITHIN A VOLUME

(75) Inventors: Jacques Y. Guigné, Paradise (CA); James A. Stacey, Paradise (CA); Nicholas G. Pace, Bath (GB)

(73) Assignee: Intelligent Sciences, Ltd., Paradise (CA)

( * ) Notice: Subject to any disclaimer, the term of this patent is extended or adjusted under 35 U.S.C. 154(b) by 422 days.

(21) Appl. No.: 12/252,379

(22) Filed: Oct. 16, 2008

(65) Prior Publication Data

US 2009/0325598 A1 Dec. 31, 2009

Related U.S. Application Data

(60) Provisional application No. 61/076,702, filed on Jun. 30, 2008.

(51) Int. Cl.
*H04W 24/00* (2009.01)

(52) U.S. Cl. ............ 455/456.1; 455/457; 342/442; 342/465; 340/5.1; 340/10.1; 370/338

(58) Field of Classification Search .......... 455/41.2, 455/404.1, 404.2, 414.2, 456.1, 456.2, 456.3, 455/456.5, 456.6, 457; 370/338; 340/5.1, 340/10.1; 342/118, 127, 128, 129, 378, 386, 342/387, 442, 465
See application file for complete search history.

(56) References Cited

U.S. PATENT DOCUMENTS

| | | | |
|---|---|---|---|
| 6,700,535 B2 * | 3/2004 | Gilkes et al. ............ | 342/387 |
| 6,717,516 B2 | 4/2004 | Bridgelall | |
| 6,745,038 B2 | 6/2004 | Callaway, Jr. et al. | |
| 6,819,286 B2 | 11/2004 | Armbruster et al. | |
| 7,630,323 B2 * | 12/2009 | Bridgelall ............ | 370/254 |
| 7,800,541 B2 * | 9/2010 | Moshfeghi ............ | 342/465 |
| 2002/0180640 A1 | 12/2002 | Gilkes et al. | |
| 2006/0052115 A1 * | 3/2006 | Khushu ............ | 455/456.3 |
| 2006/0199534 A1 | 9/2006 | Smith | |

* cited by examiner

*Primary Examiner* — Rafael Pérez-Gutiérrez
*Assistant Examiner* — Suhail Khan
(74) *Attorney, Agent, or Firm* — Richard A. Fagin

(57) ABSTRACT

A method for determining a position of a wireless electronic device within a volume includes detecting a signal transmitted by the wireless device during two-way communication to and from a first known position within the volume. The method further includes detecting the signal from at least three additional known positions within the volume, where the at least three additional known positions are spatially independent of each other. The method further includes determining a phase difference between the signal detected at the first position and the signal detected at each of the at least three additional positions, determining the position of the wireless electronic device using the phase differences, and at least one of displaying and storing the position of the wireless electronic device.

10 Claims, 7 Drawing Sheets

METHOD AND SYSTEM FOR DETERMINING POSITION OF A WIRELESS ELECTRONIC DEVICE WITHIN A VOLUME

CROSS-REFERENCE TO RELATED APPLICATIONS

Priority is claimed from U.S. provisional application No. 61/076,702, filed on Jun. 30, 2008.

FIELD

The invention relates generally to the field of wireless communication. More specifically, the invention relates to a method and system for locating a wireless electronic device.

BACKGROUND

The ability to measure the position of a mobile electronic device opens up a wide range of new applications. Applications that depend on location include location-based services, location-based advertising, context-aware computing, enhanced position determination (e.g., global positioning system—"GPS"), enhanced "911" and similar emergency response services, asset tracking and real-time location services, autonomous robotic systems, advanced man-machine interfaces, and assistive technologies for the disabled.

The availability of mobile electronic technology has substantially increased over the past decade. Cell phones, for example, have essentially saturated the market in the most developed countries. The proliferation of cell phones has introduced problems in the delivery of emergency services such as responding to "911" emergency calls due to the fact that cell phones are difficult to locate geodetically with sufficient accuracy. The U.S. Federal Communications Commission ("FCC") has mandated that enhanced 911 services be supported by the cellular telephone infrastructure, but the providers of cell phone services are limited by the technology capability of their networks, and are presently able to locate individual cell phones to within a range of about 50-300 meters of the actual phone location. In a dense urban environment, such precision is insufficient to properly locate a 911 caller. Despite the crude precision of the cell phone positioning, social networking has emerged as a new location-based service delivering revenue for the cell phone service providers.

The commercialization of the United States Armed Services GPS allowed this infrastructure to support the positioning of mobile electronic devices by calculating the distance between the device and at least four low earth orbit satellites in the constellation of GPS satellites. The emergence of handheld GPS receivers created applications for GPS location services. The key limitation of GPS is that it is unable to deliver position information inside buildings. Enhanced GPS has emerged as a new technology direction as innovators seek to extend the functionality of GPS to the indoors. This has created the need for new infrastructure known as indoor, or in-building, positioning systems.

In the Enterprise Resource Planning sector, a technology known as Radio Frequency Identification, or RFID, has become an essential part of supply chain management systems that promote the tracking of inventory and assets in the business. The idea behind RFID is that relatively cheap, "smart" tags are used to identify goods and/or assets and a sophisticated RFID system is used to locate and identify the smart tags for tracking purposes. For many companies, location-aware technology is conferring competitive advantage in the marketplace.

One of the newest markets for location aware services is in the area of online advertising. Companies such as Google, Inc., Yahoo, Inc. and Microsoft, Inc. are aggressively competing in this field. By introducing information concerning target recipient location into online advertising, the value of an online ad can be greatly increased. Location based advertising promises to become the next front in the battle for online advertising market share.

Context aware computing is yet another technology that has been promoted by the large computing manufacturers and stimulated a great deal of R&D in computer science, engineering, and industry. As computing becomes increasingly mobile, the day will come when all computing will become location aware.

Market analysts have been predicting that location based services will be a multi-billion dollar market, but the timing of this prediction has been problematic. The problem is that, as technology becomes increasingly pervasive, consumers are becoming more aware and concerned about issues such as privacy. If there is any piece of personal information that would be viewed by the consumer as sensitive, the ability of an all-pervasive technology to track an individual's position would rank near the top of the list of concerns.

Contemporary suppliers of location based services have a wide range of technology on which such services are based. Positioning technologies use detectors based on light or sound. Technologies using light include optical detectors, radio frequency detectors, and infrared detectors, which are all special cases using the electromagnetic spectrum. Sound waves can also be used with systems using ultrasound at frequencies outside the range of human hearing above 20 KHz.

Technology suppliers have been attempting to enable improved context-aware computing by improving the resolution of location measurement systems. The state-of-the-art at present seems to be location resolution in the range of 1-10 meters. Expensive systems are available that can locate to fractions of a centimeter, but such systems cannot be deployed as part of a more pervasive location aware infrastructure.

In addition to the technology used (light or sound), there is also the methodology employed to determine position that determines the effectiveness of the method. Two methods of determining position common in the present market are time (or time difference) of arrival techniques ("TOA" and "TDOA") and received signal strength indication ("RSSI"). TOA and TDOA allow calculating the position of a mobile electronic device by measuring the range from a transmitter to a multiplicity of receivers using timing electronics and knowledge of the speed of electromagnetic energy (or sound) through air. By determining the range between the transmitter and at least three independently positioned receivers, the three dimensional position may be calculated using trilateration. In the more general problem of locating a mobile device, GPS uses multilateration to calculate the position of a mobile GPS receiver. Four satellites are needed because there are 4 unknowns in the GPS problem, three values for the position (X, Y, Z) and one value for time.

For indoor position determination, TDOA systems require a multitude of receivers scattered through the surveillance volume. The cost of such systems is relatively higher as at least three receivers must be within range of the client device (the device to be located) and such receivers need to be networked together, independently powered, individually calibrated, etc. Deploying such infrastructure is cumbersome because overhead costs scale with respect to the number of receivers.

Another positioning system that is being deployed uses RSSI. Technologies such as Wireless Local Area Networks ("WLAN" or "WiFi") and Bluetooth have RSSI built in. The idea is that the proximity of a client device to a WLAN device can be inferred from signal strength of radio transmissions between the client and WLAN device. Using complex algorithms and learning networks, the rough position of the client can be inferred. The advantage of such systems is that the coverage of existing WLAN and WiFi network hubs is quite high and the incremental cost of implementing a positioning system on RSSI is very low. The disadvantage is that it doesn't make much sense to increase WLAN penetration beyond what is needed to provide basic connectivity. The accuracy of RSSI is not much better than 10 meters, or "room level."

The ubiquity of location servers will be limited until the cost of individual location servers becomes as cheap as other mass market consumer devices. Further, it is not only the cost of the location servers that must be taken into account. The cost of implementing the corresponding client location hardware and software that will limit the adoption rate of this technology must also be considered. Issues such as the cost of deploying the location aware infrastructure, the cost of maintaining and calibrating the infrastructure and the delivery of value-added services on that infrastructure will all play a role in the growth of this market.

However, it is evident that the present resolution of location aware devices is not sufficient to fully enable or deliver the promise of context aware computing. A breakthrough technology is required with a resolution that is an order of magnitude better than the current state of the art. One such technology that is being positioned as potentially delivering new levels of accuracy is Ultra-Wideband ("UWB"), which promises resolutions of order 15 cm-1 m with a multiplicity of receivers approach. Basically, the UWB system uses very narrow pulses to increase the resolving power of the TOA/TDOA approach. In order to shape a very narrow pulse, very large bandwidth is required.

US Patent Application Publication No. 2006/0199534 A1 (Location System for Bluetooth Enabled Devices) by Smith describes a method, apparatus and system for tracking and locating Bluetooth enabled devices. In this application, a network of Bluetooth sniffers is used to locate "lost" devices and their owners. A "parent" device independently monitors received signal strength between itself and a "child" device. When the signal strength of the child drops below a certain level, the child is deemed by the parent to be lost and an alert is issued to the sniffer network by the parent. Upon receipt of the alert, the sniffer network is then engaged to locate the child device through paging for the child device throughout a network of Bluetooth capable sniffer devices. The location is determined by proximity to a particular sniffer device at a known location. The method of the Smith '534 publication provides room level resolution in locating a child device which is adequate for this "lost and found" application. The methodology used uses RSSI (received signal strength indication) as the underlying technology.

U.S. Pat. No. 6,819,286 B2 (Location Determination For Mobile Units) issued to Armbruster et al. describes a method for location determination using Bluetooth techniques within buildings, underground or within other structures. The method disclosed in the '286 patent uses a multiplicity of subsidiary units arranged in a geometric pattern within the surveillance volume. A minimum of three subsidiary units are needed to measure the range to a mobile device to determine its position through trilateration techniques. This method is essentially the time delay of arrival method and relies on timing circuits for its implementation. In addition, the subsidiary units are each independently deployed through the surveillance volume and must be individually powered and networked together. The overall accuracy of the method is strongly dependent on the latencies of communications between the mobile unit and each of the subsidiary units.

U.S. Pat. No. 6,745,038 B2 (Intra-Piconet Location Determination and Tomography) issued to Callaway et al. describes a novel technique for intra-piconet location determination and tomography using received signal strength indication (RSSI). In this invention, the range between two piconet devices is determined by analyzing the destructive interference between direct and reflected wavepaths. By examining the RSSI versus carrier-frequency curve and determining the frequency separation of the nulls, the range may be determined. In principle, the method is capable of determining the range with an accuracy between 2.62 cm and 1 meter. When the position of a reflector is located at the origin, a system of equations describing the relative ranges between devices in the piconet can be solved to determine the positions of each device. In two dimensions, range measurements between a minimum of five devices are needed for solution while, in three dimensions, seven independent range measurements are needed.

U.S. Pat. No. 6,717,516 (Hybrid Bluetooth/RFID Based Real Time Location Tracking) issued to Bridgelall describes a hybrid device that allows RFID tags to be identified and located using Bluetooth technology. A plurality of fixed devices is distributed over an area containing the items to be tracked. The fixed devices are operated as RFID readers to identify and locate items having RFID tags. The fixed devices are preferably distributed at distances corresponding to twice the range of the devices when operated as RFID readers. The location of the RFID tag is inferred by several methods. The first method cited is locating a mobile slave device to within a piconet cell by determining which of the fixed devices is associated with the slave device. The resolution of this method is 30 feet (10 meters), equal to the maximum range of a Class 2 Bluetooth device. A second method is described whereby the Bluetooth cell size is adjusted to equal the range of the RFID passive tag reading capability, which has a resolution of 12-15 feet (anticipated to increase in the future with advancing technology). Finally, in a particularly preferred example, range may be determined from the phase of the response signals and the phase may be determined at a plurality of frequencies to resolve phase ambiguities. The problem of locating the position of a mobile device is addressed through defining a directional antenna beam pattern to limit the RFID tag exposure to a narrow cone angle. By changing the beam direction through electronic or mechanical beam steering the angular position of the RFID tag may be determined.

US Patent Application Publication No. 2002/0180640 (Location Estimation in Narrow Bandwith Wireless Communications Systems) by Gilkes et al. uses the phase difference between a known stable reference signal and a known signal output by a plurality of wireless mobile communications devices (location markers) at several known locations to determine the location of a mobile wireless communications device transmitting in the ISM radio band. The phase of the 1 MHz signal transmitted by the mobile device allows the phase difference to be detected within the location estimation environment within 300 meters (the wavelength of the 1 MHz signal). The location markers measure the phase difference between the embedded signal (the 1 MHz bitstream output by the Bluetooth radio) and a 1 MHz sine wave frequency reference signal that is produced at a fixed location by a stationary reference oscillator and is distributed to the location markers by coaxial cable, modified Ethernet or latency-free wireless means. A system calibration procedure is required to determine a phase delay parameter that measures the propagation delay between the reference source and each location marker. A 1 MHz phase comparator measures phase to 0.001 cycles (6.2832 milliradians), yielding 30 cm resolution (11.8 inches) in the range measured between the location marker and the mobile device. The location solution processor uses information from at least 4 non-coplanar location markers and solves simultaneous equations derived from the Cartesian coordinates of the location markers and the differences between the relative times of arrival reported by the location markers.

SUMMARY

In one aspect, the invention relates to a method for determining a position of a wireless electronic device within a volume which comprises detecting a signal transmitted by the wireless electronic device at a first known position within the volume. The method includes detecting the signal from at least three additional known positions within the volume, the at least three additional known positions being spatially independent of each other. The method includes determining a phase difference between the signal detected at the first known position and the signal detected at each of the at least three additional positions. The method includes determining the position of the wireless electronic device using the phase differences and at least one of storing and displaying the position of the wireless electronic device.

In another aspect, the invention relates to an apparatus for determining a position of a wireless electronic device within a volume which comprises a reference receiver configured to detect a signal transmitted by the wireless electronic device, this signal acting as a reference signal. The apparatus includes at least three additional receivers which are spatially independent of each other. The additional receivers are coupled to the reference to receive the reference signal and configured to detect the signal transmitted by the wireless electronic device. The apparatus further includes a processor configured to compute the position of the wireless electronic device based on phase differences between the reference signal generated by the reference receiver and the signals detected at each of the additional receivers.

Other features and advantages of the invention will be apparent from the following description and the appended claims.

BRIEF DESCRIPTION OF DRAWINGS

The accompanying drawings, described below, illustrate typical examples of the invention and are not to be considered limiting of the scope of the invention, for the invention may admit to other equally effective examples. The figures are not necessarily to scale, and certain features and certain views of the figures may be shown exaggerated in scale or in schematic in the interest of clarity and conciseness.

DETAILED DESCRIPTION

Figure 1:
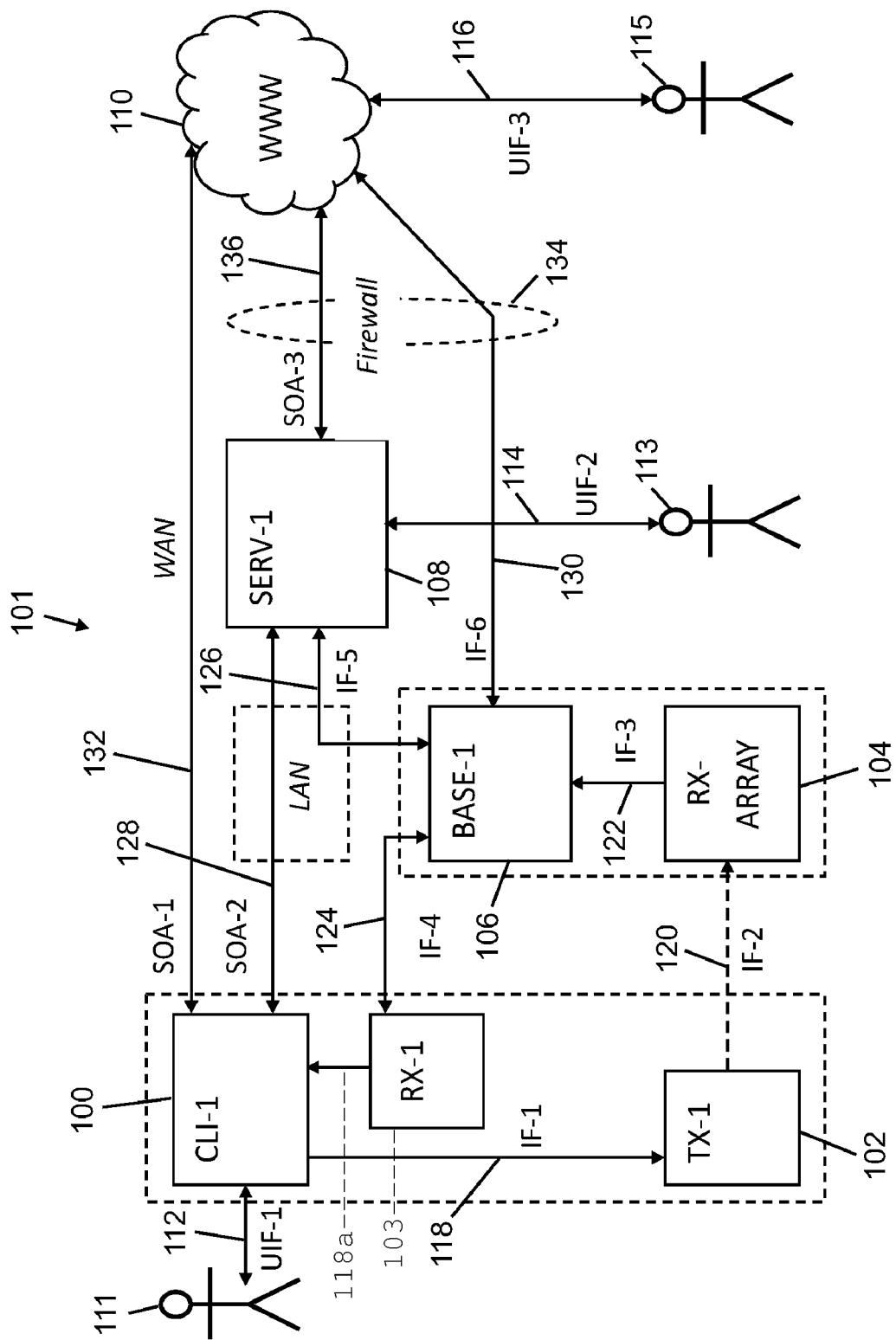
FIG. 1 depicts a system for determining a position of a wireless electronic device.

The invention will now be described in detail with reference to a few examples, as illustrated in the accompanying drawings. In describing the examples, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

FIG. 1 depicts a system 101 for determining the position of a wireless electronic device within a volume. Different combinations of components and interfaces define different systems, depending on the final application. In one example, the system 101 includes the following components: a client device (CLI-1) 100, a transmitter or transceiver (TX1) 102, a receiving sensor array (RX-ARRAY) 104, a receiving base station (BASE-1) 106, and a backend server (SERV-1) 108. The client device 100 is a wireless electronic device whose position is being measured. The client device 100 may be mobile or stationary, handheld or not. The transceiver 102 transmits an RF pulse under command of a user through the client device 100 (client mode) and/or under the command of the receiving base station 106 (server mode). The client device 100 and transceiver 102 may be physically integrated into a single device or provided as separate devices with an appropriate communication link between them. The client device 100 may receive signals from the receiving base station 106 through a receiver (RX1) 103 or transceiver 102.

The receiving sensor array 104 includes RF sensors (not shown separately) in a geometric array. The RF sensors enable the calculation of the three-dimensional (3D) position of the client device 100 by detecting RF signals issued by the transceiver 102. The receiving base station 106 receives electronic signals from the receiving sensor array 104 and employs digital signal processing techniques to process the received signals on multiple sensors and then calculates the 3D position of the client device 100. The receiving base station 106 reports this position to the client device 100 or the backend server 108, where the position may be communicated to and displayed by the client device or processed and communicated to the client as part of a value-added service by the server. The receiving base station 106 and receiving sensor array 104 may be integrated into a single device or may be provided as separate devices with an appropriate communication link between them. It is the collocation of the receiving elements within the receive array that is salient to the present invention. In practice, network devices are connected together over a LAN or WAN. Key components of the LAN are network hubs that define the network topology. The receiving base station 106 may include a wireless hub to facilitate communication with client device(s).

The system 101 can communicate with the World Wide Web (WWW) 110, for example, in order to provide location or value-added services to the client device 100. The backend server 108 acts as a portal to WWW 110 (and/or a communications network) and may deliver location services to the client device 100 (primarily in the event that the WWW is unavailable). The client device 100, backend server 108, and receiving base station 106 may communicate with the WWW 110 and a "cloud" of location aware services to which the client device 100 has subscribed.

User 111 can interact with the client device 100 through user interface (UIF-1) 112. Users of client devices may be subscribers to location-based devices. User 113 can interact with the backend server 108 through a restricted user interface (UIF-2) 114. Users of the backend server 108 may be restricted to system support personnel. User 115 can interact with WWW 110 through restricted user interface (UIF-3) 116. Users of WWW 110 that can gain access to the system 101 and the client device 100 may be restricted to internet service providers (ISPs). Client device 100 communicates with transceiver 102 through digital interface (IF-1) 118. The primary function of the interface 118 is to command the transceiver 102 to transmit data. Client device 100 may also communicate with receiver (RX-1) 103 through an interface 118a similar to digital interface 118. The function of the transmitter 102 and receiver 103 may be combined in a single device using a transmit/receive switch to enable bi-directional digital communications 124. Transmit and receive functions in the client device are separated in FIG. 1 as the signals transmitted by TX-1 need not be the same signals as those signals used to establish two-way communications between the base unit and the client electronic device. An air interface (IF-2) 120 is provided between the transceiver 102 and the receiving sensor array 104. The air interface 120 represents the transport of an RF signal in air between the transceiver 102 and the receiving sensor array 104.

The receiving sensor array 104 communicates with the receiving base station 106 via an analog interface (IF-3) 122. Each sensing element in the receiving sensor array 104 will generate analog electrical signals corresponding to the RF signals received from the client device 100. The client device 100 communicates with the receiving base station 106 through a bi-directional digital interface (IF-4) 124, as noted above. The bi-directional digital interface 124 supports the delivery of location services to the client device 100 (absolute or relative position with respect to the receiving base station 106) independently of the availability of the backend server 108 or access to WWW 110. In one or more examples of the invention, the bi-directional interface 124 uses the Bluetooth communications protocol. The receiving base station 106 communicates with the backend server 108 through a bi-directional digital interface (IF-5) 126. The backend server 108 may be configured with software to deliver value-added location based services to the client device 100 through industry standard interface (SOA-2) 128 in the event that WWW 110 is unavailable. The bi-directional digital interface 126 will typically conform to the Internet (TCP/IP) and WWW (XML/HTTP) protocols. The receiving base station 106 communicates with WWW 110 through a bi-directional digital interface (IF-6) 130. WWW 110 may also be configured with software to deliver value-added location based services to the client device 100. The bi-directional digital interface 130 supports the ability to update the receiving base station 106 software and provide access to the receiving base station 106 (for remote monitoring and control).

Web services are delivered between WWW 110 and the client device 100 independently of system 101 via the industry standard interface (SOA-1) 132. SOA is an acronym that denotes a service oriented architecture. In general, industry standard interface 132 does not traverse the firewall 134 that separates the system 101 from WWW 110. Web services are delivered between the backend server 108 and client device 100 through the industry standard interface (SOA-2) 128. These services may be a subset or superset of the services the client device 100 might access via the interface 132. Interface 128 acts as a backup interface to interface 132 for those services delivered from WWW 110 and provides the value-added services that may be unique to system 101 (i.e., application-dependent services). Services between WWW 110 and backend server 108 are delivered via industry standard interface (SOA-3) 136. Interface 136 allows the backend server 108 to be a proxy for WWW 110 and allows remote access to the backend server 108 for monitoring, control, and maintenance via interface 116.

The present invention can be implemented using commercially available RF technology (analog or digital) at low cost. A practical example is described using Bluetooth radio technology for indoor positioning applications up to 10 m in range (corresponding to Class 2 Bluetooth technology). Within the range of the proposed device, all Bluetooth devices communicate within a so-called "piconet." Multiple position server devices extend the capability of positioning within wider surveillance volumes by deploying these devices as a so-called "scatter-net."

Bluetooth radio is attractive as a technology for the present invention as it supports a high level communications protocol to facilitate the communication of value added services between location server devices and client devices. Bluetooth separates the 2.4 GHz Industry, Scientific and Medical (ISM) band into 79 channels of 1 MHz bandwidth. This channel separation provides the Bluetooth device with the ability to isolate itself from other devices transmitting in this band by allowing the Bluetooth device to transmit across each of the available channels by using a pseudo-random "hop" sequence. The Bluetooth specification supports data packets that can be retransmitted if errors in transmission occur.

The range of carrier frequencies supported by the Bluetooth standard allows the present invention to calculate phase differences between Bluetooth receiver pairs as a function of carrier frequency and thereby calculate the position of a Bluetooth client to within a few centimeters. These phase differences may be determined using commercial off-the-shelf analogue RF components. Alternative examples using digital components are equally feasible as discussed below.

The characteristics of Bluetooth radio are as follows:
Bluetooth operates in the 2.4 GHz band. In the US and Europe, a band of 83.5 MHz width is available; in this band, 79 RF channels spaced 1 MHz apart are defined. In France, a smaller band is available; in this band, 23 RF channels spaced 1 MHz apart are defined.
The wavelength of electromagnetic waves at 2.4 GHz is 0.125 m.
The communication channel is facilitated by a hopping sequence hopping through the 79 or 23 RF channels. Two or more Bluetooth devices using the same channel form a piconet. There is one master and one or more slave(s) in each piconet. The hopping sequence is unique for the piconet and is determined by the Bluetooth device address of the master.
The channel is divided into time slots where each slot corresponds to an RF hop frequency. Consecutive hops correspond to different RF hop frequencies.
The channel is divided into time slots, each 625 us in length. The time slots are numbered according to the Bluetooth clock of the piconet master.
A TDD (time division duplex) scheme is used where master and slave alternatively transmit. The master starts its transmission in even numbered time slots only, and the slave shall start its transmission in odd-numbered time slots only.

All data on the piconet channel is conveyed in packets. Each packet consists of 3 entities, the access code (68/72 bits), the header (54 bits), and the payload (0-2745 bits). The prescribed hop rate is 1600 hop/second so that the duration spanning each hop is 625 us.

The Bluetooth radio module uses GFSK (Gaussian Frequency Shift Keying) where a binary one is represented by a positive frequency deviation and a binary zero by a negative frequency deviation. The shape of the Gaussian filter (through the BT parameter) is set to 0.5 and the modulation index must be between 0.28 and 0.35.

Gaussian Frequency-Shift Keying (GFSK) is a type of Frequency Shift Keying modulation that utilizes a Gaussian filter to smooth positive/negative frequency deviations, which represent a binary 1 or 0 where the minimum deviation is 115 kHz and the maximum deviation is 175 kHz.

Figure 2:
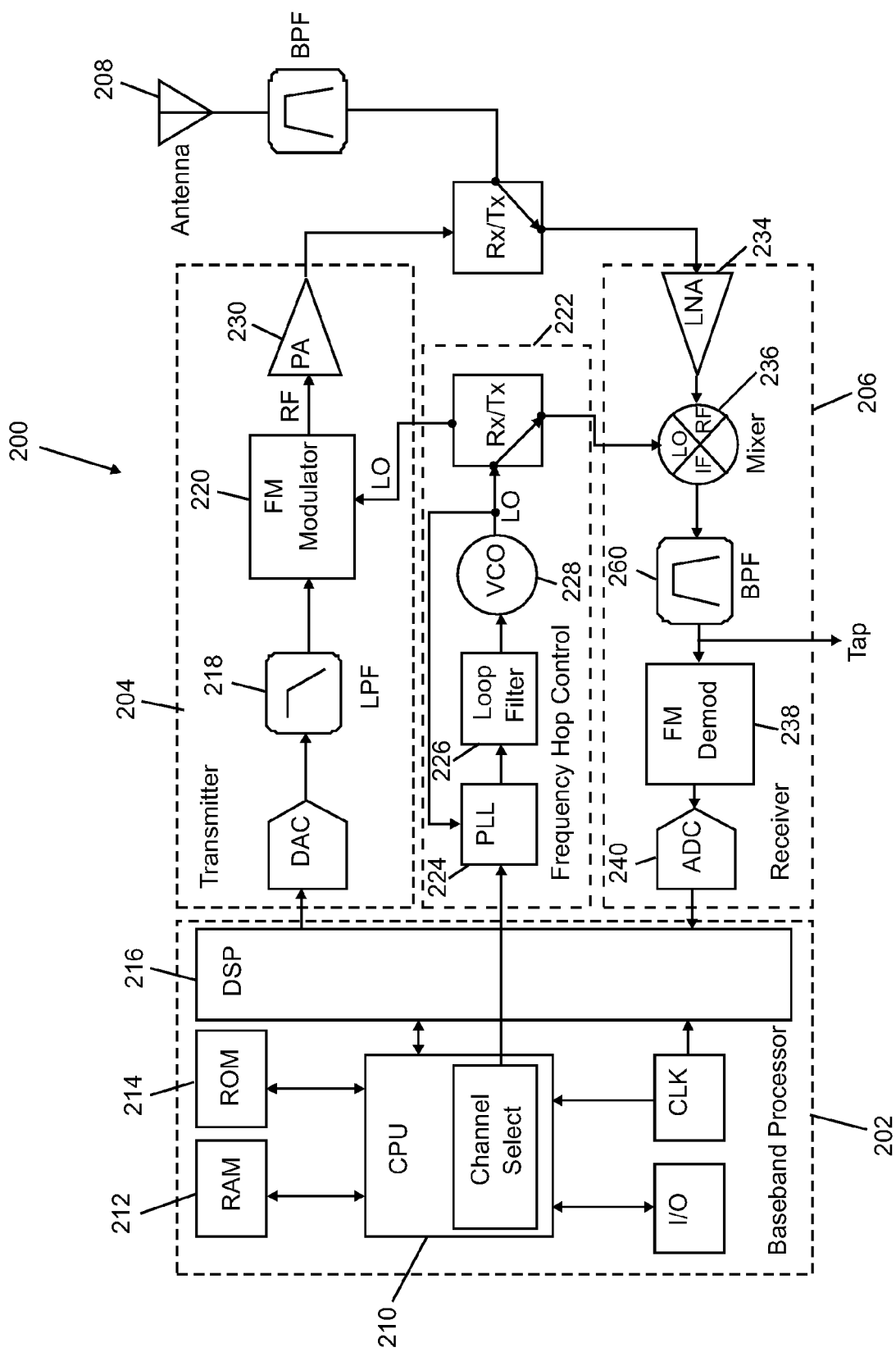
FIG. 2 is a schematic of a Bluetooth radio.

FIG. 2 is a schematic of one embodiment of a Bluetooth radio 200 (known as a superheterodyne radio). The Bluetooth radio 200 corresponds to or is a component of the receiving base station (106 in FIG. 1). The Bluetooth radio 200 consists of a baseband processor 202, transmitter 204, receiver 206 (called Receiver 0), and antenna 208. The baseband processor 202 contains a microprocessor (CPU) 210 with random access memory (RAM) 212 and flash memory (ROM) 214 which can be shared with a digital signal processor (DSP) 216. The baseband processor 202 controls the Bluetooth radio 200. In one example, the baseband processor 202 controls the switching between channels and performs the time division duplex (TDD) control.

On the transmit side of the radio, digital data at 1 Mbit/sec is converted to an analog bit stream using a digital-to-analog converter (DAC) 217 and passed through a Gaussian low pass filter (LPF) 218 to eliminate the high frequency components that would leak outside the desired channel. A FM modulator 220 modulates an intermediate frequency (IF) carrier and up-converts the modulated signal to the final radio frequency (RF) corresponding to the desired channel. The desired channel is selected through a frequency hop control circuit 222 containing a crystal reference oscillator (not shown), a phase-locked-loop (PLL) 224, a loop filter 226, and a voltage controlled oscillator (VCO) 228. The output of the FM modulator 220 is amplified by a power amplifier 230 and switched to the antenna 208 on transmit (Tx) on even numbered time slots of the master Bluetooth device. On both transmit and receive the signals are passed through a band-pass filter 232 with bandwidth of 84 MHz centered on 2442 MHz.

On the receive side of the radio, a low-noise amplifier (LNA) 234 provides about 10-15 dB of gain prior to the mixer 236. The frequency hop control circuit 222 provides a local oscillator frequency corresponding to the desired 1 MHz bandwidth channel through the local oscillator frequency LO output from the voltage controlled oscillator (VCO) 228. The channel frequency of the received harmonic signal is at frequency RF, which is defined for the k-th channel as $$RF = \omega_k + h^* \text{MOD}(t) \quad (1)$$

where $\omega^k$ is the angular frequency of the k-th channel (equal to $2\pi f_k$ where $f_k = (2402+k)$ MHz, k=0..78), h is the modulation index, and MOD(t) is the modulation function that defines the frequency modulation of the Bluetooth bit stream. In a standard Bluetooth radio, the RF signal is mixed with the LO signal to down-convert the signal to an intermediate carrier frequency IF. The modulation and phase of the RF signal is unchanged by this down-conversion. An FM demodulation circuit (FM Demod) 238 then infers the frequency modulation of the signal and outputs the envelope of the demodulated signal. This demodulated signal is then interpreted by an analog-to-digital (ADC) converter 240 as a bit-stream of 0s and 1s. After the FM demodulation, all phase information in the original carrier signal is lost.

Figure 3:
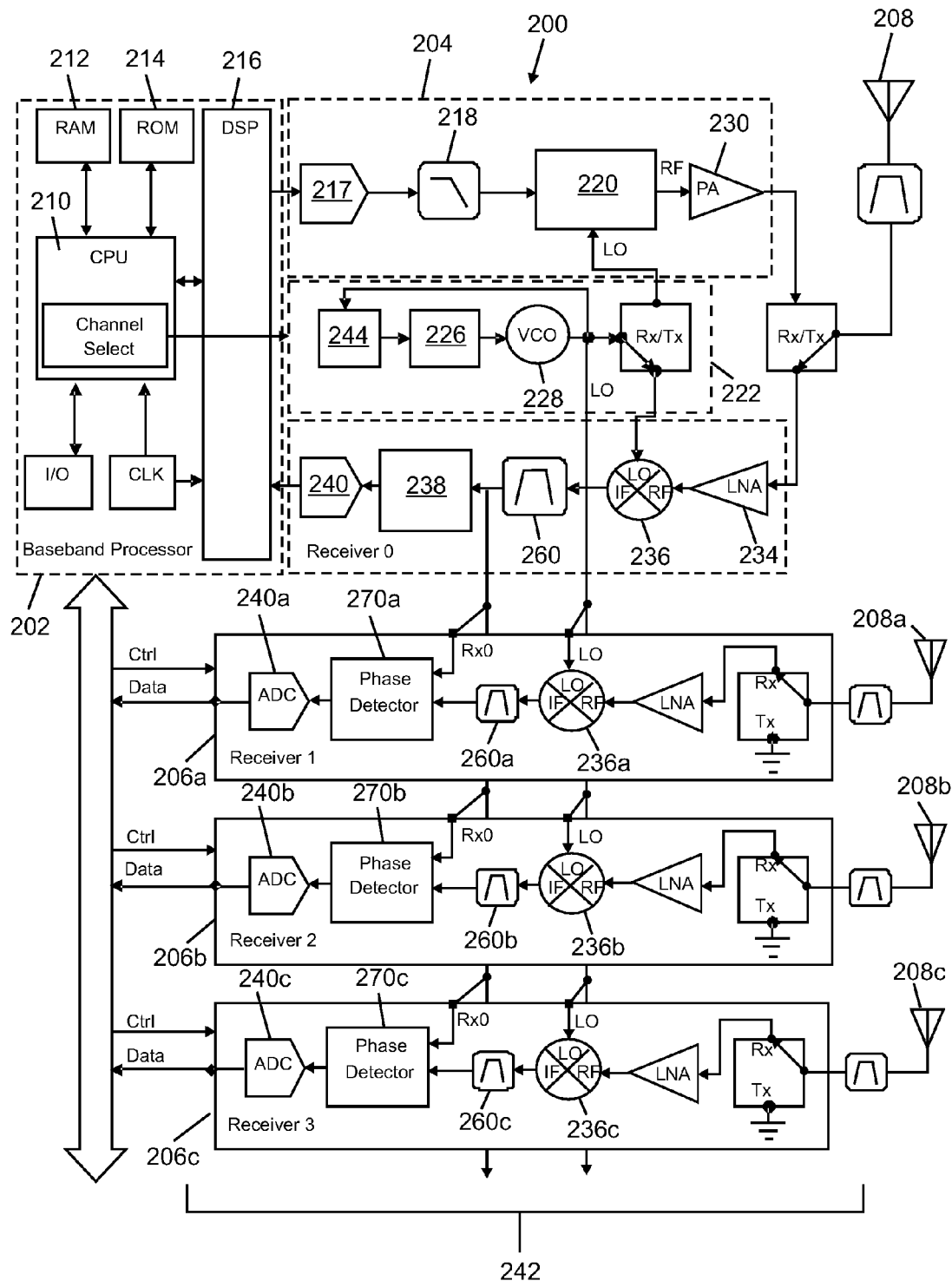
FIG. 3 is a schematic of a Bluetooth radio with phase difference array.

Referring to FIG. 3, it is on the receive side of the Bluetooth radio 200 that the present invention advances the current state of the art. The present invention implements a phase difference array (PDA) by preserving the absolute phase of the original RF frequency in the 2.4 GHz band and calculating the phase differences between pairs of geometrically independent receivers (in a manner that is described below). First, it is shown that it is possible to preserve the phase information of the original signal when the signal is down-converted to an intermediate frequency IF. Next, it is shown that the down-converted RF signal from one antenna may be used as the reference signal for all remaining signals from an array of geometrically independent antennas. The signal from each antenna is then processed by an independent radio receiver. Finally, by pairing the signals from geometrically independent antennas relative to the reference antenna in the manner indicated herein, the difference in phase between the original signals in the 2.4 GHz band that correspond to the time difference of arrival may be measured with a novel new approach that does not require timing electronics. These measurements are digitized and passed back to the baseband processor 202 to calculate the position using a phase difference algorithm that solves the non-linear trilateration equations.

In FIG. 3, an array of receivers 242 (corresponding to the receiving sensor array 104 in FIG. 1) communicates with the Bluetooth radio 200. In the illustrated example, the array of receivers 242 includes receiver 206a (called Receiver 1), receiver 206b (called Receiver 2), and receiver 206c (called Receiver 3). In general, the array of receivers 242 may include three or more receivers. Let $\phi_{rf}$ be the absolute phase of the RF signal, $\phi_{lo}$ the absolute phase of the local oscillator, $\phi_1$ the phase of the transmitted signal at Receiver 1 and $\phi_0$ the phase of the transmitted signal at Receiver 0. Receiver 0 and Receiver 1 represent one pairing of receivers in the proposed phase difference array comprising the present invention. Other receiver pairings would be Receiver 2 and Receiver 0, Receiver 3 and Receiver 0, and so on. In this arrangement, the Receiver 0 is the reference receiver with which all receiver pairings are made. The summed total of these receiver pairings comprise the receiving phase difference array. If the antenna for Receiver 0 is taken to be at the origin of the array, then the positions of the remaining antennas define the geometry of the array. The remaining antennas are arranged such that they are spatially independent.

The mixing of the signals between the receivers in a receiver pairing defines the phase difference that is unique to the present invention. Mixing of signals will now be described for receiver pairing Receiver 0 and Receiver 1, but the same principle can be applied to any receiver pairing in the system, e.g., Receiver 0 and Receiver 2, Receiver 0 and Receiver 3, and so on. Let $S_1(t)$ be the harmonic RF signal received at Receiver 1 and $S_0(t)$ be the harmonic RF signal received at Receiver 0 (reference receiver). Further, let R(t) be the reference signal generated by the local voltage controlled oscillator (VCO) 228 at frequency LO=$\omega_k+\Delta\omega$, where $\omega_k$ is the angular frequency of the k-th channel and $\Delta\omega$ is a constant angular frequency offset (typical values for $\Delta\omega$ are 110.6 MHz, 110 MHz, or 43 MHz). Then, $$S_1(t) = V_1 \cos(RF * t + \phi_1 + \phi_{rf}) \quad (2)$$

$$S_0(t) = V_0 \cos(RF * t + \phi_0 + \phi_{rf}) \quad (3)$$

$$R(t) = V_r \cos(LO * t + \phi_{lo}) \quad (4)$$

where the amplitudes of the harmonic and VCO outputs are $V_1$, $V_0$ and $V_r$, respectively.

The common reference signal R(t) output by the VCO 228 of Receiver 0 is routed to the mixer electronics 236a, 236 for both Receiver 1 and Receiver 0, respectively (and similarly for each receiver pairing in the array). Each mixer in the receiver array outputs signals (in this case, $MIX_1(t)$ and $MIX_0(t)$ are the mixer outputs for Receiver 1 and Receiver 0, respectively) that combine the harmonic signals as follows $$MIX_1(t) = LPF(R(t) * S_1(t)) \quad (5)$$
$$= LPF(V_r \cos(LO * t + \varphi_{lo}) * V_1 \cos(RF * t + \varphi_1 + \varphi_{rf}))$$

$$MIX_0(t) = LPF(R(t) * S_0(t)) \quad (6)$$
$$= LPF(V_r \cos(LO * t + \varphi_{lo}) * V_0 \cos(RF * t + \varphi_0 + \varphi_{rf}))$$

The mixer combines the harmonic signals with the reference signal and outputs sum and difference terms for the combined signals, which can be calculated using a well-known mathematical identity for the product of cosine functions to be $$R(t) * S_1(t) = \left(\frac{1}{2} K_1 V_r V_1\right) \begin{bmatrix} \cos((LO - RF) * t + (\varphi_{lo} - \varphi_{rf}) - \varphi_1) + \\ \cos((LO + RF) * t + (\varphi_{lo} + \varphi_{rf}) + \varphi_1)) \end{bmatrix} \quad (7)$$

$$R(t) * S_0(t) = \left(\frac{1}{2} K_0 V_r V_0\right) \begin{bmatrix} \cos((LO - RF) * t + (\varphi_{lo} - \varphi_{rf}) - \varphi_0) + \\ \cos((LO + RF) * t + (\varphi_{lo} + \varphi_{rf}) + \varphi_0)) \end{bmatrix} \quad (8)$$

where $K_1$ and $K_0$ have dimensions [1/V] and represent the mixer gains. The low pass filter function LPF(*) filters out the high frequency component, leaving the following as the final output of the mixers:

$$MIX_1(t) = \left(\frac{1}{2} K_1 V_r V_1\right) \cos((LO - RF) * t + (\varphi_{lo} - \varphi_{rf}) - \varphi_1) \quad (9)$$

$$MIX_0(t) = \left(\frac{1}{2} K_0 V_r V_0\right) \cos((LO - RF) * t + (\varphi_{lo} - \varphi_{rf}) - \varphi_0) \quad (10)$$

The outputs of the mixers 236, 236a are then passed through bandpass filters 260, 260a, respectively, centered on the intermediate frequency IF=LO−RF=Δω with a bandwidth of 1 MHz. For the other receiver pairs, similar outputs of mixers 236b, 236c would be passed through bandpass filters 260b, 260c, respectively, centered on the intermediate frequency IF=LO−RF=Δω with a bandwidth of 1 MHz. A Bluetooth radio may have multiple stages of mixing, amplification and filtering at successive intermediate frequencies, but the output of each such IF-stage is similar—the output being a new intermediate frequency carrier with a modulation signal, a constant phase difference ($\phi_{lo} - \phi_{rf}$) and a unique receiver phase that passes through the mixer unchanged.

At this point, the outputs of the mixers (236, 236a) are processed differently. The output $MIX_0(t)$ of mixer 236 is passed to the FM demodulation circuit 238 of the Bluetooth Receiver 0 to extract the modulation signal and output the bitstream corresponding to the digital data of the radio signal. In this way, Receiver 0 can act as a normal Bluetooth device (master or slave) and process digital communications signals according to the Bluetooth protocols. The output of the FM demodulator circuit 238 is converted from an analog voltage to a digital output by the analog-to-digital converter (ADC) 240 and routed back to the baseband processor 202.

Simultaneously, the output $MIX_0(t)$ of mixer 236 is passed to the receiver array 242 electronics to serve as the phase reference for the phase difference array. In the illustrated example, the outputs $MIX_1(t)$ from mixer 236a and $MIX_0(t)$ from mixer 236 are passed to a phase detector circuit 270a (which will be comprised of phase comparators, filters and associated electronics) that outputs a voltage that is proportional to the phase difference of the signals $MIX_1(t)$ and $MIX_0(t)$. This output is simply ($\phi_0 - \phi_1$), the difference in absolute phase due to the path length difference in the transmitted signal to Receiver 0 and Receiver 1, respectively. All other components of the signal (due to the carrier frequency, the modulation of the carrier frequency, and the absolute phases of the radio frequency and oscillator signals) cancel out, leaving an output voltage representing the phase difference of the receiver pair. Similar outputs will be output by the other receiver pairs at phase detector circuits 270b, 270c. The outputs of the phase detector circuits 270a, 270b, 270c are then converted from an analog voltage to a digital output by analog-to-digital converters (ADC) 240a, 240b, 240c, respectively, and routed back to the baseband processor 202, which determines the location of the transmitting client device (100 in FIG. 1) using an algorithm described in more detail below.

In the present invention, the phase reference for the entire system is taken to be the RF signal received on one of the radio receivers of the receiver array. Thus, when the phase differences corresponding to time differences of arrival (TDOA) of the RF signal across each receiver pairing of the receiver array are processed, the constant phase differences between the LO and RF signal that do not correspond to a time difference of arrival at each receiver all cancel out. The remaining phase difference due only to the TDOA across each receiver pair (where each receiver in the array is paired with the reference receiver which is taken to be located at the origin) is then the phase difference used to calculate the position of the client device that is transmitting at that time.

There are only a finite number of places in the analog receiver processing chain where the signal can be tapped to provide the signals for the methods used by the present invention. In FIG. 3, the point at which the signal is extracted from the radio circuit is indicated just before the FM demodulator 238. Alternative examples are possible and are described below.

The circuitry to analyze the phase difference between receiver pairs can be implemented with analog phase detectors. The output of a phase detector is typically a current sink/source that can be used to drain or charge the capacitor of a low-pass filter (effectively acting as an integrating circuit) to yield a voltage output that is a known function of the phase difference on the range (−pi,+pi). This circuit is very similar to the PLL 224, Loop Filter 226, VCO 228 combination employed in the frequency hop control circuit 222, but in this case, it is the voltage output from the integrating circuit that is desired. With current technology, phase differences can be calculated with fractional errors of 1e−3 to 1e−4.

The analog circuitry for the receiver array 242 is indicated in FIG. 3. Note that, in this simplified schematic, many intermediate stages in the radio (amplification and filtering) are not shown. Note also that the figure only shows three receivers paired with the reference receiver (Receiver 0). Three receiver pairs is a minimum configuration for 3D location measurements.

The Bluetooth radio 200 connected to the origin antenna 208 is a full-featured Bluetooth radio (as described above) with baseband processor 202, transmitter 204, and receiver 206 and acts as the controller for the entire system and communicates with external Bluetooth devices in its reception volume. This radio provides the local oscillator frequency reference LO from the channel frequency control circuit 222 that switches all receivers to the same channel. Receiver 0 also provides the analog reference signal $MIX_0(t)$ that is compared with the signals received on each of the receiver antennas (208a, 208b, 208c) in the array of receivers 242. Each receiver signal is compared with the reference signal and a phase difference is calculated by a phase detector circuit (270a, 270b, 270c). It is the analog voltage corresponding to the phase difference from each receiver pair that is digitized by an ADC (240a, 240b, 240c) and passed to the DSP 216 in the baseband processor 202. Ideally, the voltage output from the phase detector (270a, 270b, 270c) is linearly related to the phase difference. However, once the output is digitized, any non-linearities can be corrected by the baseband processing algorithms.

The fact that Receiver 0 corresponds to a normal Bluetooth radio allows the error correction circuitry of the baseband processor 202 to be employed to validate the phase difference data output by the phase difference array. The baseband processor 202 can correlate digital data from Bluetooth packets with the digitized output of the phase difference array containing those packets in real-time. If a Bluetooth communications packet is received without errors, then it can be assumed that the carrier signal for that packet has been received without interference (say from multipath reflections) and the phase differences based on that uncorrupted packet can also be presumed to be uncorrupted by interference.

Although the proposed example outlined above is based on analog electronic components, the output of the mixers (236, 236a, 236b, 236c) can be superposed on an essentially arbitrary intermediate frequency IF without losing the phase information. In an alternative example of the proposed invention, the output of the mixers could be passed directly through ADCs and the output stored in memory for subsequent digital signal processing to determine the phase differences directly in the digital domain using known methods in the art of digital signal processing.

In another alternative example of the proposed invention, the output of the low-noise amplifiers at each of the receiver antennas (208, 208a, 208b, 208c) could be digitized just prior to the mixer electronics (236, 236a, 236b, 236c) and the entire radio implemented digitally. In each such example, the processing chain of the phase difference array as described above may be implemented using the art of digital signal processing. As the transfer functions of each of the analog components are known in the art of analog radio electronics, there is no theoretical impediment to implementing any of the analog components described above as an equivalent digital processing algorithm. The engineering choice between analog versus digital processing of the signals from the phase difference array in a given example will be driven primarily by the availability of low cost commercial off-the-shelf (COTS) components from which a commercially viable device can be constructed.

The algorithms that implement the Phase Difference Array (PDA) method have the following novel features:

A method of accurate position determination using narrowband (<1 MHz bandwidth) radio signals over a range of carrier frequencies in the Industrial, Scientific and Medical (ISM) band at 2.4 GHz.

A method of calculating the time difference of arrival of multiple signals to high accuracy without a timing circuit or common time reference.

A method of improving the accuracy of position determination using long continuous wave (CW) signals used by existing radio technologies independently of the frequency modulation of the carrier.

A method of improving the accuracy of position determination by specifying the channel frequency hop sequence subsequent to a client position location request.

The time difference of arrival of multiple signals can be calculated to high accuracy without a timing circuit or common time reference. This phase difference array method identifies the time difference of arrival as being equal to the slope of phase differences between RF receiver pairs as a function of RF carrier frequency. This is a new application of a known method in the art of sonar signal processing. One of the advantages of this approach is that this method can be applied to arrays of receiver pairs separated by greater than ½ wavelength with phase ambiguities resolved as explained below The position of the client RF device is then calculated by solving the trilateration equations for arrays of 3 receiver pairs and solving the multi-lateration equations for arrays with more than 3 receiver pairs. The attainable accuracy for determining position advances the current state of the art (typically 1 m accuracy for WiFi and RFID) by 1-2 orders of magnitude. The apparatus and methods in this invention processes positions with accuracies in the centimeter range. This is an important innovation in narrowband RF position determination and opens up new applications and market opportunities.

Another attractive feature of the proposed approach allows position to be determined using narrowband RF signals. Typical RF ranging is strongly dependent on accurate timing and discrimination of RF pulses, with the accuracy of the method dependent on the pulse width. Narrow pulse widths require a very broad spectrum of frequencies (broadband signals). An example of this approach is ultra-wideband (UWB) ranging. This approach is infeasible with narrow-band signals employed widely today. The ability of measuring position with narrow-band signals allows the present invention to calculate position of a communications channel during transmission. This allows the system to combine position measurements with data communications.

Often in short baseline devices it is the phase difference alone that is used to obtain angles and the range is obtained by other means. In such cases special considerations are needed to have both a baseline of a few wavelengths and a means of resolving the $2\pi$ ambiguity that arises for baselines longer than a half wavelength. The time delays are obtained to sufficient accuracy by measuring the phase difference between sensors at a number of the Bluetooth hop frequencies. As noted above, the slope of the line of phase differences versus frequency gives the time delay directly.

The GFSK modulated signals received by the antennas are processed such that they occupy a frequency band 84 MHz wide in the 2.4 GHz band. The frequency shift to define bits as 1 or 0 is about 115 kHz. A packet of data contains about 2745 bits after which another carrier frequency is used from the 79 channels available.

The phase difference between two sensors is measured over the duration between frequency hops when the device is transmitting. The accuracy of the phase difference measurement is significantly enhanced over the direct output of the phase comparator circuit as it is obtained over a time period of about 600 μsecs which corresponds to many thousands of cycles.

During the next received packet the phase difference is again measured, but it is now at a different hop frequency. This continues over a range of the hop frequencies. If during the location mode all the possible hop frequencies were used the time required would be 79*2*625 μsec which corresponds to about $1/10^{th}$ sec. But in practice a smaller range would be used. Perhaps only the 23 hop frequencies available in France might be used.

Figure 8B:
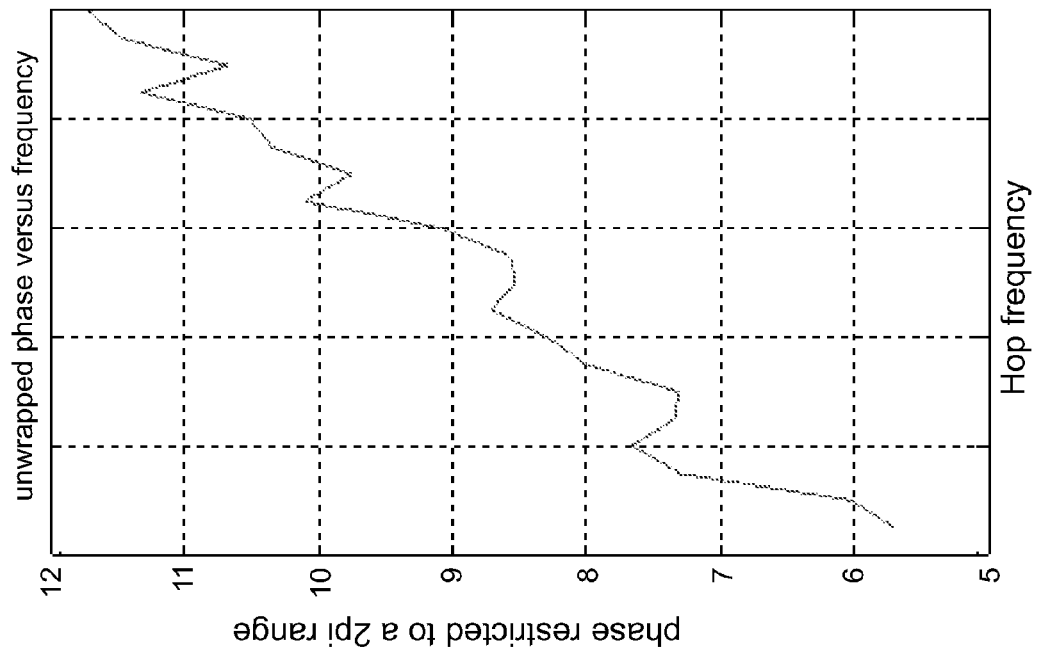
FIGS. 8A and 8B depict unwrapping of phase at phase-wrapping boundary.
Figure 8A:
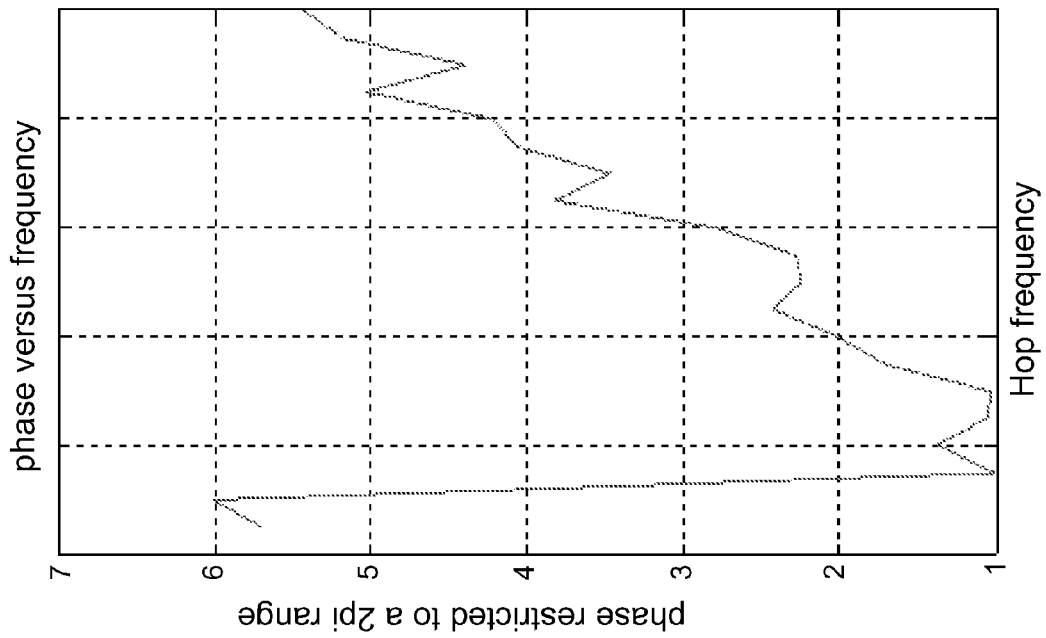

As the rate of change of phase with frequency is time, so the slope of the phase difference between sensors with frequency is the time delay between the sensors. If the phase difference between sensors separated by a baseline of N wavelengths becomes greater than $2\pi$ as the frequency varies then an unwrapping of the phase difference would be necessary. This is possible but preferably to be avoided. The phase wrapping problem is illustrated in FIGS. 8A and 8B. Plotting the phase difference versus frequency to obtain the time delay it may be necessary to make one adjustment of $2\pi$, as illustrated. Using robust estimation techniques, for example, the necessary adjustment for phase unwrapping can be implemented in software.

The slope of a straight line through the data is calculated in a least squares manner and provides the estimate of the time delay. If each point on the phase difference versus frequency plot has a standard deviation of a, then the standard deviation of the time delay estimate is $$\Delta t = \sqrt{12a^2 / (N_h(N_h^2 - 1))} \frac{1}{f_c} \qquad (11)$$

where $N_h$ is the number of hop frequencies used and where a is the error in the measurement of phase difference in radians.

The actual time between sensors is $$t = \frac{N}{f_c} \qquad (12)$$

where $f_c$ the mean carrier frequency and N is the spacing in wavelengths.

The fractional error in the time delay measurement as a function of the number of hop frequencies and the baseline in wavelengths can then be written as $$\frac{\Delta t}{t} = \sqrt{\left(\frac{12a^2}{N_h(N_h^2 - 1)}\right)} \frac{1}{N} \qquad (13)$$

This relationship shows that the accuracy of the method described herein depends on three complementary techniques: 1) increasing the accuracy of the phase detection circuitry (relative errors of 0.001-0.0001 with current technology), 2) increasing the number of hop frequencies $N_h$ over which the phase slope is calculated, and 3) increasing the baseline of the phase difference array.

Figure 6:
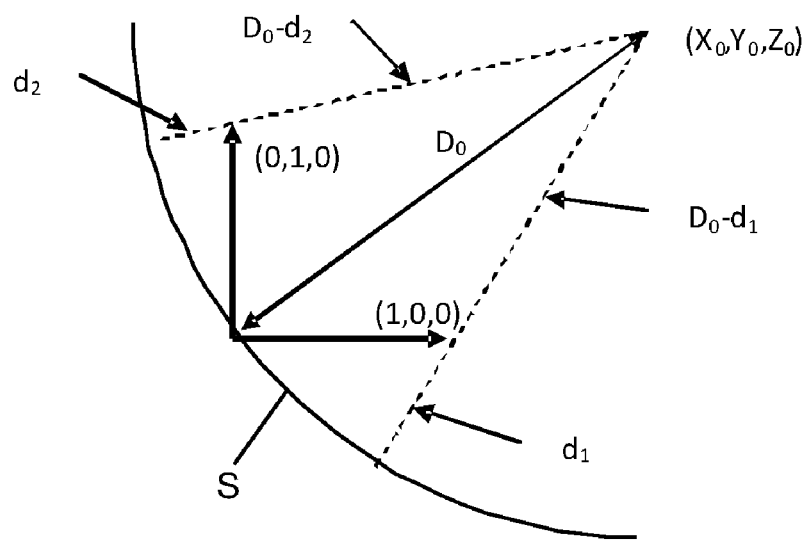
FIG. 6 depicts a geometry of multi-lateration equations.

Referring to FIG. 6, the idea behind all the multi-lateration equations solved herein is that a transmitter emits a spherical wave S originating at its true position $(X_0, Y_0, Z_0)$ and which propagates to the 3D phase difference array at the speed of light c. The signals received on each element of the phase difference array will have absolute phases relative to the phase of the signal received at the origin of the array. By pairing the receivers relative to the origin, receiver pairings are defined and through these pairings, phase differences may be defined. From these phase differences the time differences of arrival are determined as described above. From these time differences, path differences may be defined simply by multiplying each time difference by c. With the path differences between the sensors and the wavefront defined, the geometry of the path differences relative to that spherical wavefront is determined and defines the geometry of the multi-lateration problem.

It is important to note that the methods of this invention apply to phase difference arrays with a geometry that can be defined very generally, with different separations (i.e. baselines) for individual receivers, different orientations of the receiver pairs, different numbers of receiver pairs, and different numbers of reference antennas defining independent phase difference arrays, all within a single compact device. The specific examples of phase difference array geometries for three and four receiver pairs outlined below illustrate how the method can be applied to these cases. Application to the general case follows in a straightforward fashion.

Figure 4:
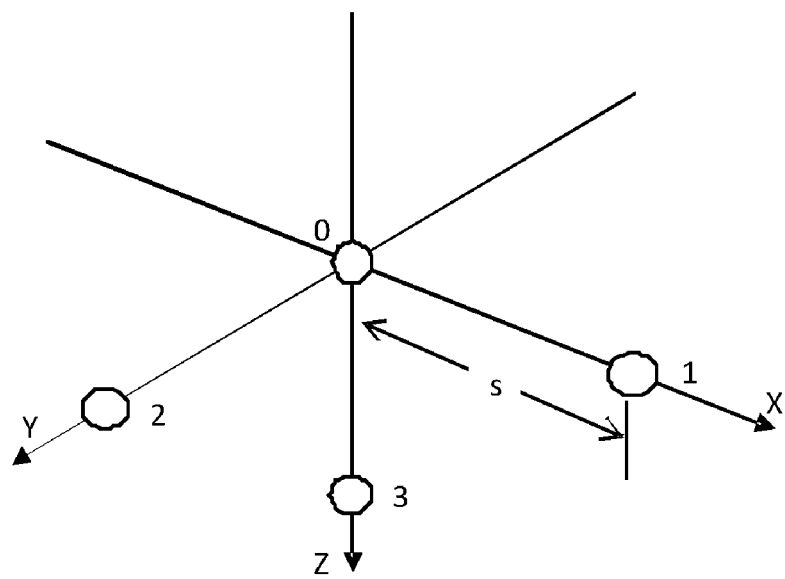
FIG. 4 depicts a 3D phase difference array geometry with three receiver pairings.

In FIG. 4, a 3-dimensional phase difference array with 3 receiver pairs is defined with 4 antennas (0, 1, 2, 3) at positions (0,0,0), (1,0,0), (0,1,0), and (0,0,1) where all positions are in units of s, the separation of the antennas from the origin. If each antenna is separated from the origin by one wavelength, then s is 12.5 cm at 2.4 GHz. The antenna at the origin provides the reference signal for calculating the phase differences at the antennas located at the unit vectors along the x, y and z axes. The phase differences correspond to path length differences $d_1$, $d_2$ and $d_3$ for the x, y and z antennas respectively. For simplicity, all calculations are expressed in units of s. The methods described here may be extended in a straightforward fashion to more general phase difference array geometries where the antennas are located at different separations and with different orientations relative to the origin.

The nonlinear equations to be solved find (X, Y, Z) such that $$(X-1)^2 + Y^2 + Z^2 - (D-d_1)^2 = 0 \qquad (14)$$

$$X^2 + (Y-1)^2 + Z^2 - (D-d_2)^2 = 0 \qquad (15)$$

$$X^2 + Y^2 + (Z-1)^2 - (D-d_3)^2 = 0 \qquad (16)$$

where $$D^2 = X^2 + Y^2 + Z^2 \qquad (17)$$

These equations represent 4 equations in 4 unknowns. Substituting for D, these nonlinear equations can be simplified to $$f_1 = X - d_1\sqrt{X^2 + Y^2 + Z^2} - \frac{1}{2}(1 - d_1^2) = 0 \qquad (18)$$

$$f_2 = Y - d_2\sqrt{X^2 + Y^2 + Z^2} - \frac{1}{2}(1 - d_2^2) = 0 \qquad (19)$$

$$f_3 = Z - d_3\sqrt{X^2 + Y^2 + Z^2} - \frac{1}{2}(1 - d_3^2) = 0 \qquad (20)$$

In this form, the equations are straightforward to solve for (X,Y,Z) using the Newton-Raphson method in three dimensions, for example. An exact solution may also be derived.

In the present invention there is no dependence on timing circuits to determine the range. The position may be obtained directly from the path differences obtained from the phase delays alone. The position is determined by solving the exact equations for a spherical wave emitted from a point source. The method is thus an exact method that provides accurate position measurements in the near-field (traditional phased arrays typically are formulated with far-field approximations to these exact equations and require ranging (measuring time of flight of broadband pulses) and directions of arrival measurements to resolve position.)

As noted above, the accuracy of the method can be further improved by improving the resolution of the phase difference circuit, increasing the separation of the antennas, and increasing the number of hop frequencies. Additionally, it is possible to increase the number of cycles used to determine the phase, and adding additional receiver pairs (or adding additional arrays). The case of adding an additional receiver pair is now examined.

Figure 5:
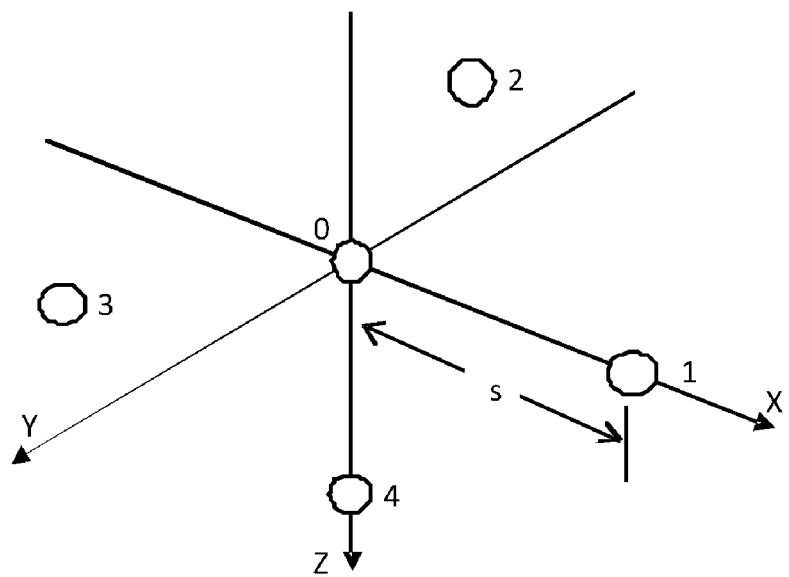
FIG. 5 depicts a 3D phase difference array geometry with four receiver pairings.

The effect of adding an additional receiver pair into the phase difference array is not only to improve the overall accuracy of the method, but also to allow the multi-lateration equations to be linearized and solved analytically. In FIG. 5, a 3D phase difference array with 4 receiver pairs is defined with 5 antennas (0, 1, 2, 3, 4) at positions (0,0,0), (1,0,0), (−a, −b, 0), (−a, b, 0) and (0,0,1) where all positions are in units of s, the separation of the antennas from the origin, a=cos(30) and b=cos(60). We can then define $$d_1 = D - \sqrt{(X-1)^2 + Y^2 + Z^2} \quad (21)$$

$$d_2 = D - \sqrt{(X+a)^2 + (Y-b)^2 + Z^2} \quad (22)$$

$$d_3 = D - \sqrt{(X+a)^2 + (Y+b)^2 + Z^2} \quad (23)$$

$$d_4 = D - \sqrt{X^2 + Y^2 + (Z-1)^2} \quad (24)$$

The following six equations can be constructed by taking sensors 1, 2, 3 two at a time where the $\alpha_i$ and $\beta_i$ can be expressed in terms of the $d_i$ and a and b (and implicitly s):

$$2X = \alpha_1 D + \beta_1 \quad (25)$$

$$2X = \alpha_6 D + \beta_6 \quad (26)$$

$$2Y = \alpha_2 D + \beta_2 \quad (27)$$

$$2Y = \alpha_3 D + \beta_3 \quad (28)$$

$$2Y = \alpha_5 D + \beta_5 \quad (29)$$

$$2Z = \alpha^4 D + \beta_4 \quad (30)$$

where $2\beta_5 = \beta_3 + \beta_2$ and $2\alpha_5 = \alpha_3 + \alpha_2$. Thus three linear equations in D can be found $$D_{16} = \frac{\beta_1 - \beta_6}{\alpha_6 - \alpha_1} \quad (31)$$

$$D_{35} = \frac{\beta_3 - \beta_5}{\alpha_5 - \alpha_3} \quad (32)$$

$$D_{52} = \frac{\beta_5 - \beta_2}{\alpha_2 - \alpha_5} \quad (33)$$

Any of the foregoing equations can be used directly for an estimate of D, and then (X, Y, Z) can be obtained from the above equations. Each of the equations contains $d_1$, $d_2$, and $d_3$ and provides the same estimate. Simulations have shown that even with very large phase errors the three solutions give effectively the same result.

The non-linearity of the tri-lateration equations can be removed by the additional receiver pair that, in effect, solves for the range D directly (D is the source of non-linearity in determining X, Y, Z). The additional receiver pair provides increased robustness as the equations can be solved exactly and provides increased accuracy.

Figure 7A:
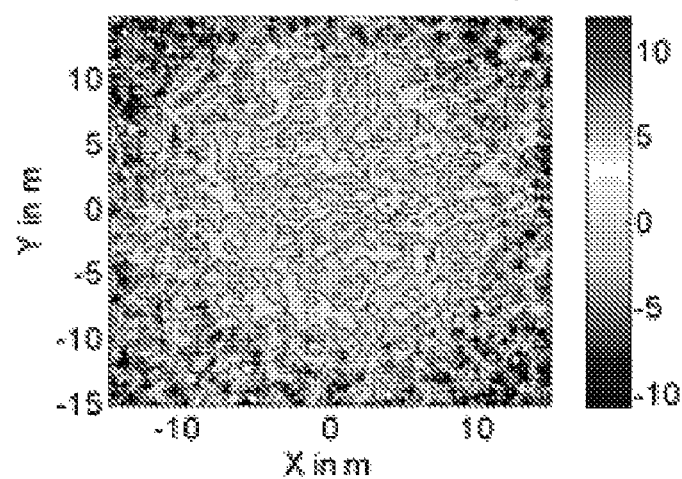
FIGS. 7A-7D are graphs depicting positioning accuracy of phase difference array.
Figure 7B:
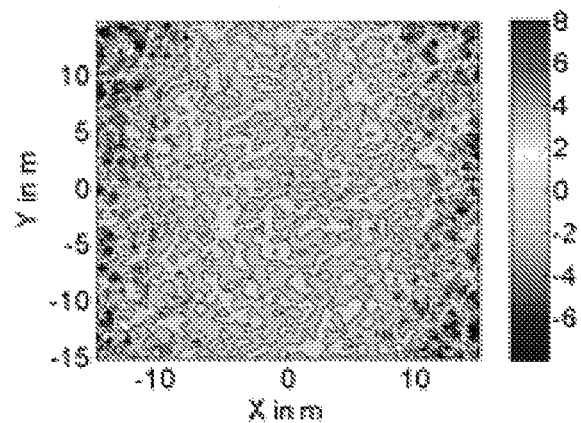
Figure 7C:
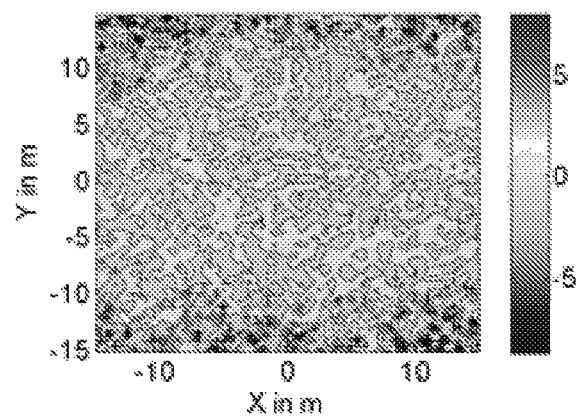
Figure 7D:
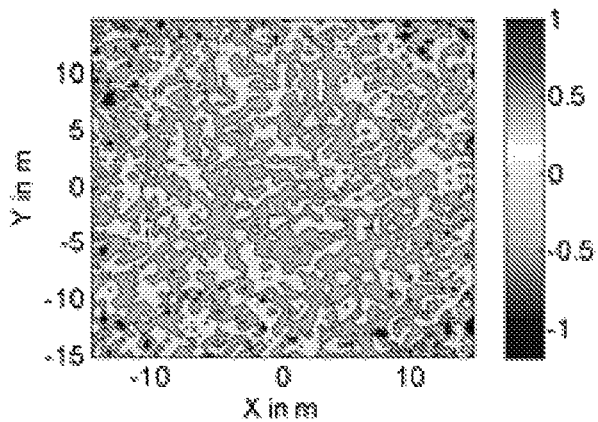

The accuracy of the phase difference of arrival algorithm is tabulated in Table 1 below and illustrated in FIGS. 7A-7D. For the case where the baseline is one wavelength (the nominal baseline) and the relative error of the phase detector circuit is 1e-3 (the conservative case), and calculating the phase differences at 50 different hop frequencies, the standard deviation of the error in calculating range is 2.25 cm in the plane defined by $|X| \leq 15$ m, $|Y| \leq 15$ m, and Z=2 m. FIG. 7A shows the differences between the mean range predicted and true range in cm in this plane has a standard deviation of 2.2503 cm with a mean absolute difference of 1.5214 cm (when the standard phase error is 0.001 radians, number of frequency hops is 50, and the baseline is 1 wavelength). FIG. 7B shows the differences between the mean X predicted and true X in cm has a standard deviation of 1.5607 cm with a mean absolute difference of 0.98693 cm. FIG. 7C shows the differences between the mean Y predicted and true Y in cm has a standard deviation of 1.5919 cm with a mean absolute difference of 0.99156 cm. FIG. 7D shows the differences between the mean Z predicted and true Z in cm has a standard deviation of 0.21975 cm.

TABLE 1

| Phase error (radians) | Baseline in wavelengths | Z (m) | Std Dev of differences between true and extracted range for $|X| \leq 15$ m, $|Y| \leq 15$ m (cm) |
|---|---|---|---|
| 0.001 | 1 | 2 | 2.25 |
| 0.0001 | 1 | 2 | 0.23 |
| 0.0001 | 0.5 | 2 | 0.93 |
| 0.0001 | 0.5 | 1 | 0.93 |
| 0.001 | 0.5 | 1 | 5.8 |

The manufacturing of the phase difference array introduces errors in the positions of the antennas that, when combined with the finite size of the antennas, necessitates a calibration to determine the "phase centers" of the antennas. This calibration can be performed after the base unit is manufactured and before the unit is shipped. During calibration the base station is positioned at a number of known positions relative to a transmitter and the time delays measured. The predicted and actual transmitter position is then brought into coincidence using well-known methods in nonlinear optimization in several variables to give the positions of the phase centers of each sensor in the array.

In Table 2 below, the results of a simulation of sensor spacing recovery using the proposed calibration method is presented (all spacing of receivers is nominally 1 wavelength, or 125 mm). The data shows that the phase centers of the antennas may be determined to high accuracy (<0.1 mm) when the number of transmitter positions used in the calibration is equal to 100. This indicates that the phase difference array approach may be calibrated to achieve the stated levels of accuracy inherent in the method.

TABLE 2

| Error in transmitter coords at X = Y = 15 m, Z = 2 m | 1.5 cm | 3 cm | 6 cm |
|---|---|---|---|
| Phase error (radians) | 0.001 | 0.001 | 0.001 |
| Initial assumed value of s | 125 mm | 125 mm | 125 mm |
| Real value of s | 130 mm | 130 mm | 130 mm |
| Mean value of final s | 130 mm | 130.00 mm | 129.99 mm |
| Std. Dev. of error | 0.076 mm | 0.099 mm | 0.12 mm |
| Error in predicting X at X = 15 m due to error in s with original value of s | 1746.37 mm | 1758.92 mm | 1752.4 mm |
| Error in predicting X at X = 15 m due to std. dev. in final value of s | 25.86 mm | 33.92 mm | 40.20 mm |

In the present invention, a solution for real-time location determination is based on narrowband radio frequency (RF) technology and uses a novel new apparatus and methods collectively embodied as a "phase difference array". The proposed technology and methodology have a competitive advantage in the accuracy of position that can be rendered versus competing technologies (<5 cm) and by virtue of this accuracy enables new classes of applications that can exploit this accuracy (e.g., location based advertising at point of sale, assistive technologies, indoor navigation systems, context aware computing). The only technology that appears to offer similar accuracy in the market segments of interest is ultra-wideband (accuracy about 15 cm). Other technologies are progressively worse in overall accuracy: RFID (~1 m), WLAN (~1m), GPS (~10 m outdoors, no accuracy indoors), cell phone location, E911 (50 m-300 m). Optical locating systems have potentially very high accuracy (<1 cm) but at high cost and limited applicability (primarily robotic systems). Competitive ultrasonic systems provide only room level accuracy.

A practical example of the proposed invention is based on Bluetooth radio as the underlying technology. Bluetooth is a very widely deployed technology that uses the RF spectrum in the Industry, Scientific and Medical band at 2.4 GHz. Using Bluetooth allows the proposed location serving technology, method and system described herein to be used with the 100 s of millions of Bluetooth enabled devices already in the market. The proposed system takes advantage of the economies of scale that have already been achieved by Bluetooth devices. The proposed device provides accurate position determination in a small compact device. It will be substantially easier to deploy and calibrate in the field. The proposed invention can also be manufactured using commercial off-the-shelf hardware. The proposed invention is also designed to integrate easily into a "cloud" of intelligent location aware infrastructure delivering value added services to mobile electronic devices.

The present invention uses phase delays for much higher resolution (order of centimeters versus meters or tens of meters with existing technologies), which significantly advances the art of Bluetooth technology.

The present invention uses direct measurement of phase differences to attain its accuracy. The advantage of the present device is that only two devices are required to determine the position of the client device; namely, the client itself and the proposed location serving technology of the present invention. In the present invention, the slope of the phase differences as a function of frequency directly yields the time differences of arrival without requiring timing circuits and, most importantly, the method presented resolves phase ambiguities.

In the present invention, a method is given that determines to high accuracy the three-dimensional position X, Y, and Z relative to the location server; i.e. the phase difference array and associated aspects of the present invention.

In the present invention, high accuracy is inherent in the method. Higher accuracy is obtained not only by taking advantage of statistical averaging over multiple frequencies but, in addition, higher accuracy is obtained by calculating the phase difference over many cycles of a continuous wave narrowband signal. Most importantly, the narrowband signal used in the present invention directly processes the phase differences of the carrier signals in the ISM radio band (2.4 GHz) The higher frequencies used by the present invention is an engineering advance that has much higher inherent accuracy for location determination.

The invention described herein encloses all the detectors required to locate the mobile unit within a single compact unit for reduced power and cost. The trilateration equations can be solved to much higher precision if the time delay of arrivals can be measured with high accuracy. This is achieved by the present invention without requiring timing circuitry. The method used here relies on phase differences rather than time delays directly. Finally, the accuracy of the method proposed herein is greatly improved since transmission latencies are explicitly cancelled out by locating the receivers in close proximity within a single detector device.

It is a unique feature of the present invention that no external reference signal requiring a complex and expensive distribution network is required. The present invention also has much higher inherent accuracy by virtue of the processing of the phase differences at the carrier frequencies in the ISM band (2.4 GHz) versus the frequency of the Bluetooth radio output (1 MHz). The present invention determines position to <5 centimeter accuracy. This accuracy is inherent in the unique capability of the present invention to measure the phase difference at the carrier frequencies in the 2.4 GHz ISM band.

While the invention has been described with reference to a limited number of specific examples, those skilled in the art having the benefit of the foregoing description will be able to devise other examples that do not depart from the scope of the invention as disclosed herein. Accordingly, the invention should be limited in scope only by the attached claims.

What is claimed is:

1. A method for determining a position of a wireless electronic device within a volume, comprising:
    detecting a signal transmitted by the wireless electronic device for two-way communication at a first known position within the volume;
    detecting the signal at at least three additional known positions within the volume, the at least three additional known positions being spatially independent of each other and of the first known position;
    determining a phase difference at each of a plurality of frequencies between the signal detected at the first position and the signal detected at each of the at least three additional positions, the phase difference determined without use of a time reference;
    determining the position of the wireless electronic device using a determined relationship of the phase differences with respect to frequency; and
    at least one of storing and displaying the position of the wireless electronic device.

2. The method of claim 1 wherein the transmitted signal is a Bluetooth two-way communication signal.

3. The method of claim 1 wherein the volume is disposed within a building.

4. The method of claim 1 wherein the position is determined in three dimensions.

5. The method of claim 1 wherein the wireless electronic device comprises a cellular telephone.

6. The method of claim 1 wherein the phase difference relationship with respect to frequency of the detected signals is used to determine at least one time difference between the detected signals.

7. An apparatus for determining a position of a wireless electronic device within a volume, comprising:

a reference receiver configured to detect a two-way communication signal transmitted by the wireless electronic device and used as a corresponding reference signal;

at least three additional receivers which are spatially independent of each other, said additional receivers being coupled to the reference receiver to receive the reference signal and being configured to detect the signal transmitted by the wireless electronic device; and a processor configured to compute the position of the wireless electronic device based on a determined relationship of a phase difference with respect to frequency at a plurality of frequencies between the signal detected by the reference receiver and the signals detected at each of the additional receivers, the processor configured to determine phase differences without a time reference.

8. The apparatus of claim 7, wherein the reference receiver is configured to detect a Bluetooth two-way communication signal.

9. The apparatus of claim 7, wherein each of the additional receivers comprises a phase detector circuit which produces an output that is indicative of the phase difference between the signal detected by the reference receiver and the signal detected at each of the additional receivers.

10. The apparatus of claim 7 wherein the processor is configured to determine a time difference between detection of the signal detected by the reference receiver and the signals detected at least one of the additional receivers based on a plurality of frequencies of the detected signals.

* * * * *